United States Patent
Lappe et al.

(10) Patent No.: US 11,823,242 B2
(45) Date of Patent: Nov. 21, 2023

(54) ALGORITHM AND TECHNICAL SYSTEM FOR DISPLAYING OFFERS

(71) Applicant: Direct Offer, Inc., Nashville, TN (US)

(72) Inventors: Kathleen Lappe, Nashville, TN (US); Jonathan Burton, Gallatin, TN (US)

( * ) Notice: Subject to any disclaimer, the term of this patent is extended or adjusted under 35 U.S.C. 154(b) by 0 days.

(21) Appl. No.: 18/095,526

(22) Filed: Jan. 10, 2023

(65) Prior Publication Data

US 2023/0169559 A1 Jun. 1, 2023

Related U.S. Application Data

(63) Continuation of application No. 16/920,760, filed on Jul. 6, 2020, now Pat. No. 11,551,275.

(51) Int. Cl.
| | |
|---|---|
| *G06Q 30/00* | (2023.01) |
| *G06Q 30/0601* | (2023.01) |
| *G06F 9/54* | (2006.01) |
| *G06Q 30/0283* | (2023.01) |
| *G06Q 50/16* | (2012.01) |
| *G06Q 30/018* | (2023.01) |

(52) U.S. Cl.
CPC ......... *G06Q 30/0611* (2013.01); *G06F 9/542* (2013.01); *G06Q 30/0185* (2013.01); *G06Q 30/0283* (2013.01); *G06Q 30/0641* (2013.01); *G06Q 50/163* (2013.01)

(58) Field of Classification Search
CPC ........................ G06Q 30/0611; G06Q 30/0641
See application file for complete search history.

(56) References Cited

U.S. PATENT DOCUMENTS

| | | | | |
|---|---|---|---|---|
| 2001/0034696 | A1* | 10/2001 | McIntyre | G06Q 40/06 705/37 |
| 2004/0024682 | A1* | 2/2004 | Popovitch | G06Q 30/06 705/37 |
| 2004/0143450 | A1* | 7/2004 | Vidali | G06Q 50/167 705/38 |
| 2005/0119908 | A1* | 6/2005 | Hippe | G06Q 50/16 705/313 |

(Continued)

OTHER PUBLICATIONS

Goossens, Dries R., et al. "Solids: a combinatorial auction for real estate." Interfaces 44.4 (2014): 351-363.*

*Primary Examiner* — Kathleen Palavecino
(74) *Attorney, Agent, or Firm* — Thrasher Associates

(57) ABSTRACT

A method implemented in software and a software system for dynamically determining how to display one or more statements of interest (such as an offer or soft offer) is disclosed. After receiving one or more statements of interest from potential buyers, a software-implemented method determines a preferred manner for displaying one or more statements of interest received from the potential buyers to the seller, and displays the offers in a grid layout. The grid layout shows a number of buyers interested in making a hard offer in a manner that gives the seller insight regarding pricing their property as well as other factors that are determined to likely make the property more valuable. The one or more statements of interest are categorized into one or more categories, including the seller's displayed (and quoted) price. Each of the categories is associated with a price range, and optionally the price range is determined using machine learning techniques.

19 Claims, 9 Drawing Sheets

(56) References Cited

U.S. PATENT DOCUMENTS

| | | | |
|---|---|---|---|
| 2006/0015451 A1* | 1/2006 | Heyer | G06Q 20/10 |
| | | | 705/39 |
| 2007/0150401 A1* | 6/2007 | Brucato | G06Q 40/04 |
| | | | 705/37 |
| 2011/0252012 A1* | 10/2011 | Kanduri | G06F 16/9535 |
| | | | 707/706 |
| 2014/0108218 A1* | 4/2014 | Ram | G06Q 30/08 |
| | | | 705/37 |
| 2016/0314525 A1* | 10/2016 | Dull | G06Q 30/08 |
| 2018/0308171 A1* | 10/2018 | Duquette | G06Q 30/0601 |

* cited by examiner

FIG. 6 - Mobile user-interface that shows a home-buying app with a selected home FIG. 7 – Grid layout of Offers

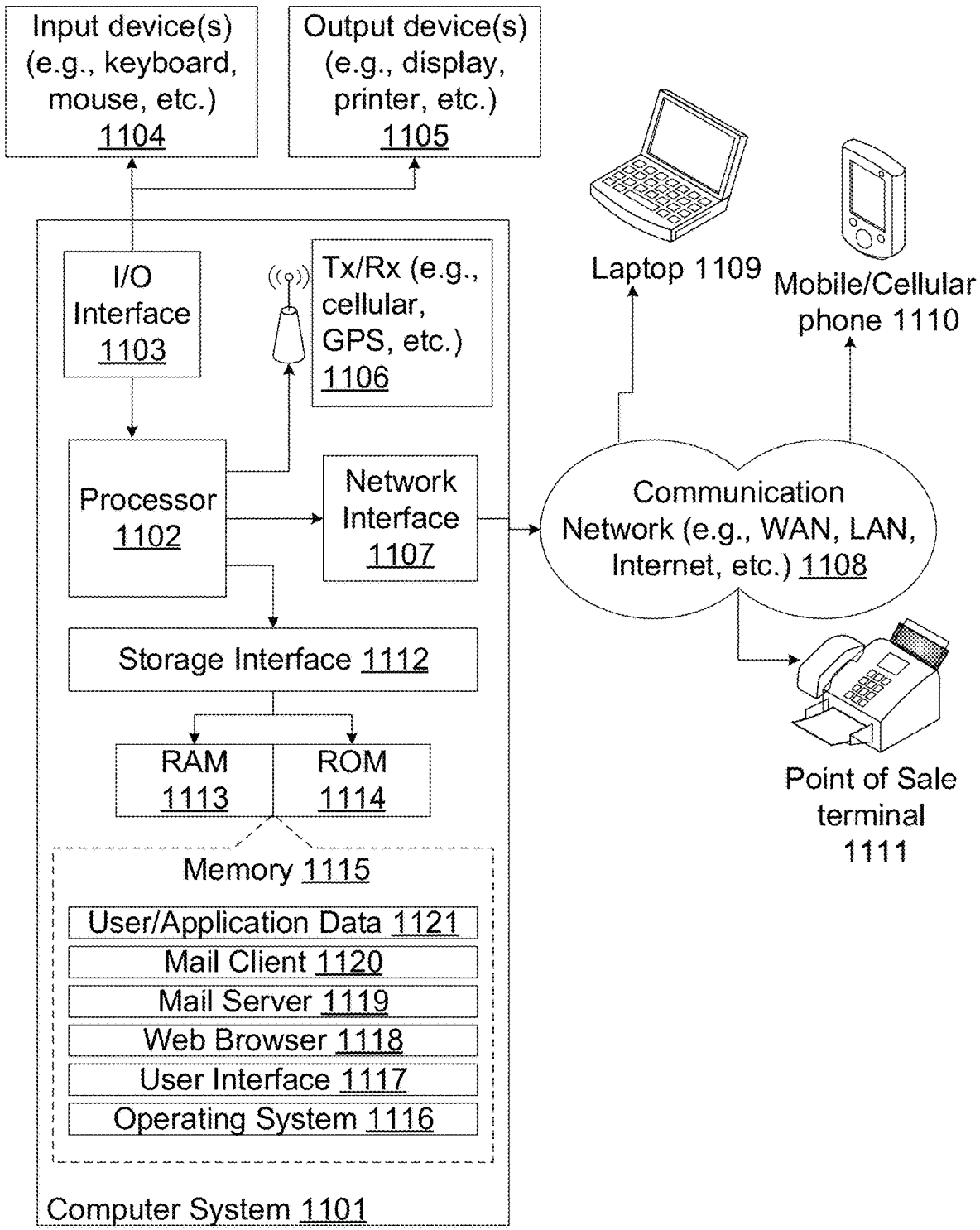
FIG. 11 Example Computer System

ALGORITHM AND TECHNICAL SYSTEM FOR DISPLAYING OFFERS

TECHNICAL FIELD

This Non-Provisional Patent Application is a Continuation of and claims priority from U.S. Utility patent application No. 16/920,760 filed on 6 Jul. 2020 entitled ALGORITHM AND TECHNICAL SYSTEM FOR DISPLAYING OFFERS, to common inventor Lappe.

The presently disclosed embodiments are related, in general, to software algorithms and systems for facilitating real estate transactions. More particularly, the presently disclosed embodiments are related to software methods and technical systems for determining how to display one or more offers associated with a real estate asset available for sale.

BACKGROUND

Conventionally, while buying and selling a real estate asset, a seller has to, among a myriad of other things, arrange an online listing and/or an open house where a plurality of buyers come and tour the real estate asset to decide whether to buy the real estate asset or not. Once the buyer desires to buy the asset then then the typically a buyer or buyer's agent proposes a first price to the seller to buy the real estate asset. Often, the seller may receive plurality of interests from a plurality of buyers with different ranges of prices for selling the real estate asset.

In this conventional approach, the buyers are not provided a transparent system for buying the real estate asset, and this can cause buyers to miss an opportunity to buy the real estate asset because of a slightly higher offer placed by some other buyers which they were unaware. Additionally, in the conventional approach the seller may not be completely aware of the number of or amounts of offers that the seller's agent has received. Further, because the seller has incomplete information, the seller cannot make fully informed decisions about, for example, correcting a cosmetic defect or adjusting the asking price.

In addition, the current real estate process of offers and counteroffers lacks transparency and auditability. This system relies on agents to be completely competent, honest, transparent, and timely; accordingly, there are many variables in the selling and buying process. Stated another way (and not surprisingly) all agents are not equal.

Quite simply, neither buyers nor sellers have a more complete and informative overview of the process. For example, a potential buyer in a proposed real estate transaction cannot in real-time track the status of an offer; a seller cannot in real-time track how many offers have been received on a property, nor how their agent is handling those offers without speaking to the agent. Similar problems are endemic in the rental property application process at the time of this application. A crisis in confidence is the inevitable result.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

According to embodiments illustrated herein, there are provided methods implemented in software for displaying one or more offers. The method may be implemented by a seller electronic device including one or more processors. The method may include displaying a real estate asset available for sale to a plurality of buyers. In an embodiment, the plurality of buyers provide an input indicating interest for purchase of the real estate asset. The method may include initiating a countdown for a pre-defined time interval. In an embodiment, the plurality of buyers are notified to submit one or more offers for purchase of the real estate asset. The method may include in response to the notification, receiving one or more offers from the plurality of buyers. The method may also include displaying the one or more offers received from one or more buyers to a seller. In an embodiment, the one or more offers are displayed in a grid layout. Further, the grid layout shows a number of buyers interested in making the one or more offers, and the one or more offers may be categorized into one or more categories based on a seller's quoted price. Further, each of the one or more categories may be associated with a price range and the price range is determined using one or more machine learning techniques.

According to embodiments illustrated herein, there may be provided a system that includes a seller electronic device configured to display one or more offers. The seller electronic device may further include one or more processors configured to display a real estate asset available for sale to a plurality of buyers. In an embodiment, the plurality of buyers provide an input indicating interest for purchase of the real estate asset. The seller electronic device may further include one or more processors configured to initiate a countdown for a pre-defined time interval. In an embodiment, the plurality of buyers are notified to submit one or more offers for purchase of the real estate asset. The seller electronic device may further include one or more processors configured to in response to the notification, receive one or more offers from the plurality of buyers.

The seller electronic device may also include one or more processors configured to display the one or more offers received from one or more buyers to a seller, and the one or more offers are displayed in a grid layout. In an embodiment, the grid layout shows a number of buyers interested in making the one or more offers. In an embodiment, the one or more offers are categorized into one or more categories based on a seller's quoted price, and further each of the one or more categories may be associated with a price range and the price range is determined using one or more machine learning techniques.

BRIEF DESCRIPTION OF DRAWINGS

The accompanying drawings illustrate the various embodiments of systems, methods, and other aspects of the disclosure. Any person with ordinary skills in the art will appreciate that the illustrated element boundaries (e.g., boxes, groups of boxes, or other shapes) in the figures represent one example of the boundaries. In some examples, one element may be designed as multiple elements, or multiple elements may be designed as one element. In some examples, an element shown as an internal component of one element may be implemented as an external component in another, and vice versa. Further, the elements may not be drawn to scale.

Various embodiments will hereinafter be described in accordance with the appended drawings, which are provided to illustrate and not to limit the scope in any manner, wherein similar designations denote similar elements, and in which:

FIG. 11 illustrates a block diagram of an exemplary computer system for implementing embodiments consistent with the present disclosure.

DETAILED DESCRIPTION

The present disclosure may be best understood with reference to the detailed figures and description set forth herein. Various embodiments are discussed below with reference to the figures. However, those skilled in the art will readily appreciate that the detailed descriptions given herein with respect to the figures are simply for explanatory purposes as the methods and systems may extend beyond the described embodiments. For example, the teachings presented and the needs of a particular application may yield multiple alternative and suitable approaches to implement the functionality of any detail described herein. Therefore, any approach may extend beyond the particular implementation choices in the following embodiments described and shown.

References to "one embodiment," "at least one embodiment," "an embodiment," "one example," "an example," "for example," and so on indicate that the embodiment(s) or example(s) may include a particular feature, structure, characteristic, property, element, or limitation but that not every embodiment or example necessarily includes that particular feature, structure, characteristic, property, element, or limitation. Further, repeated use of the phrase "in an embodiment" does not necessarily refer to the same embodiment.

Figure 1:
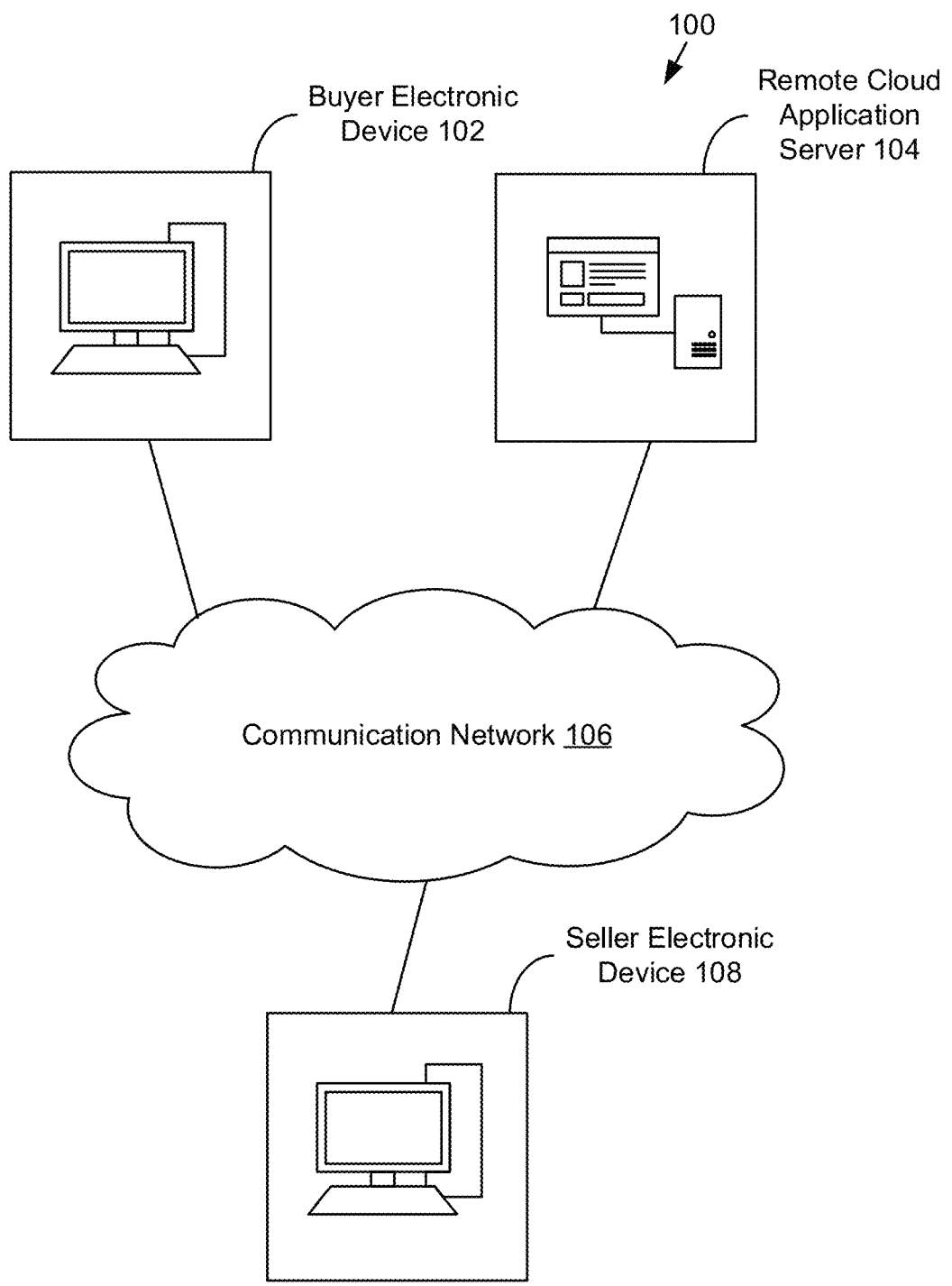
FIG. 1 is a block diagram that illustrates a system environment in which various embodiments of the method and the system may be implemented.

FIG. 1 is a block diagram that illustrates a system environment 100 in which various inventive embodiments of the method and system may be implemented. The system environment 100 typically includes a buyer electronic device 102, a remote cloud application server 104, a communication network 106, and a seller electronic device 108. The buyer electronic device 102, the remote cloud application server 104, and the seller electronic device 108 are typically communicatively coupled with each other via the communication network 106.

The buyer electronic device 102 may refer to a computing device used by the buyer. The buyer electronic device 102 may comprise of one or more processors and one or more memories. The one or more memories may include computer readable code that may be executable by the one or more processors to perform predetermined operations. In an embodiment, the buyer electronic device 102 may present a user-interface to the buyer for displaying one or more offers. Examples of the buyer electronic device 102 may include, but are not limited to, a personal computer, a laptop, a personal digital assistant (PDA), a mobile device which may include a tablet, smart phone or smart watch such as an Apple Watch® or any other computing device.

The buyer electronic device 102 is preferably configured to display a real estate asset available for sale from a seller. The buyer electronic device 102 may be configured to accept an input indicating interest for purchase of the real estate asset. The buyer electronic device 102 is also preferably configured to receive notification to submit offers for purchase of the real estate asset within pre-defined time interval. Further, the buyer electronic device 102 is preferably configured to provide offers for purchase of the real estate asset to a seller. The buyer electronic device 102 is in an embodiment configured to notify each of a plurality of buyers when at least one of the plurality of buyer submits one or more offers for purchase of the real estate asset.

The remote cloud application server 104 may include a database server (not shown but understood by those of ordinary skill in the cloud internet arts). The database server may refer to a computing device that may be configured to store one or more trained machine learning models, training data, one or more offers, and the like. Additionally, the remote cloud application server 104 may communicate with the database server using one or more protocols such as, but not limited to, Open Database Connectivity (ODBC) protocol and Java Database Connectivity (JDBC) protocol.

The database server may include a special purpose operating system specifically configured to perform one or more database operations on the multimedia content. Examples of database operations may include, but are not limited to, Select, Insert, Update, Push, Pull, and Delete. Additionally, the database server may include hardware that is configured to perform one or more predetermined operations. Accordingly, the database server may be realized through various technologies such as, but not limited to, Microsoft® SQL Server, Oracle®, IBM DB2®, Microsoft Access®, PostgreSQL®, MySQL® and SQLite®, and the like.

The remote cloud application server 104 may be configured to receiving the one or more offers from the electronic device of the seller. The remote cloud application server 104 is preferably configured to determine a number of columns and a number of rows to be displayed in a grid layout based on count of the one or more offers to be displayed. The remote cloud application server 104 may be further configured to categorizing the one or more offers into one or more categories based on a seller's quoted price and each of the one or more categories has an associated price range that is determined using machine learning techniques.

In selected embodiments, the remote cloud application server 104 is configured to identify one or more fraudulent offers from the one or more offers and in response to such identification adjusting the price range associated with each of the one or more categories. Additionally, the remote cloud application server 104 may be configured to determining a number of buyers interested in making the one or more offers, and/or configured to transmit data comprising number of columns and number of rows to be displayed in a grid layout, categorized offers, fraudulent offers and updated price range to the seller's electronic device.

A person with ordinary skills in the art will understand that the scope of the disclosure is not limited to the database server as a separate entity. Further, the functionalities of the database server can be integrated into the remote cloud application server 104.

In an embodiment, the communication network 106 may correspond to a communication medium through which the buyer electronic device 102, the remote cloud application server 104, and the seller electronic device 108 may communicate with each other. Such a communication may be performed, in accordance with various wired and wireless communication protocols. Examples of such wired and wireless communication protocols include, but are not limited to, Transmission Control Protocol and Internet Protocol (TCP/IP), User Datagram Protocol (UDP), Hypertext Transfer Protocol (HTTP), File Transfer Protocol (FTP), ZigBee, EDGE, infrared (IR), IEEE 802.11, 802.16, 2G, 3G, 4G, 5G, 6G cellular communication protocols, and/or Bluetooth (BT) communication protocols, for example. Additionally, the communication network 106 may include, but is not limited to, the Internet, a cloud network, a Wireless Fidelity (Wi-Fi) network, a Wireless Local Area Network (WLAN), a Local Area Network (LAN), a telephone line (POTS), and/or a Metropolitan Area Network (MAN).

The seller electronic device 108 may refer to a computing device used by the seller, which may be similar to or different from the buyer electronic device 102. Accordingly, the seller electronic device 108 may comprise of one or more processors and one or more memories. The one or more memories may include computer readable code that may be executable by the one or more processors to perform predetermined operations. Thus, the seller electronic device 108 may present a user-interface to the seller for displaying one or more offers. Examples of the seller electronic device 108 may include, but are not limited to, a personal computer, a mobile device such as a laptop, a personal digital assistant (PDA), a tablet, a smart watch, or any other computing device.

The seller electronic device 108 is preferably configured to display a real estate asset available for sale to a plurality of buyers. Thus, the seller electronic device 108 may be configured to receiving an input from the plurality of buyers indicating interest for purchase of the real estate asset. Additionally, the seller electronic device 108 may be configured to initiating a countdown for a pre-defined time interval, and/or configured to notifying the plurality of buyers to submit one or more offers for purchase of the real estate asset. Further, the seller electronic device 108 may be configured to receive one or more offers from the plurality of buyers, and may also be configured to transmitting the one or more offers to the remote cloud server.

The seller electronic device 108 is preferably configured to receive data comprising number of columns and number of rows to be displayed in a grid layout, categorized offers, fraudulent offers and updated price range to the seller's electronic device, and the seller electronic device 108 may be configured to display a number of buyers interested in making the offer(s). Accordingly, the seller electronic device 108 is preferably configured to displaying the one or more offers received from one or more buyers to a seller in a grid layout.

A person having ordinary skill in the art will appreciate that the scope of the disclosure is not limited to realizing the seller electronic device 108 and the remote cloud application server 104 as separate entities. In an embodiment, the remote cloud application server 104 may be realized as an application program installed on and/or running on the seller electronic device 108 without departing from the scope of the disclosure.

Figure 2:
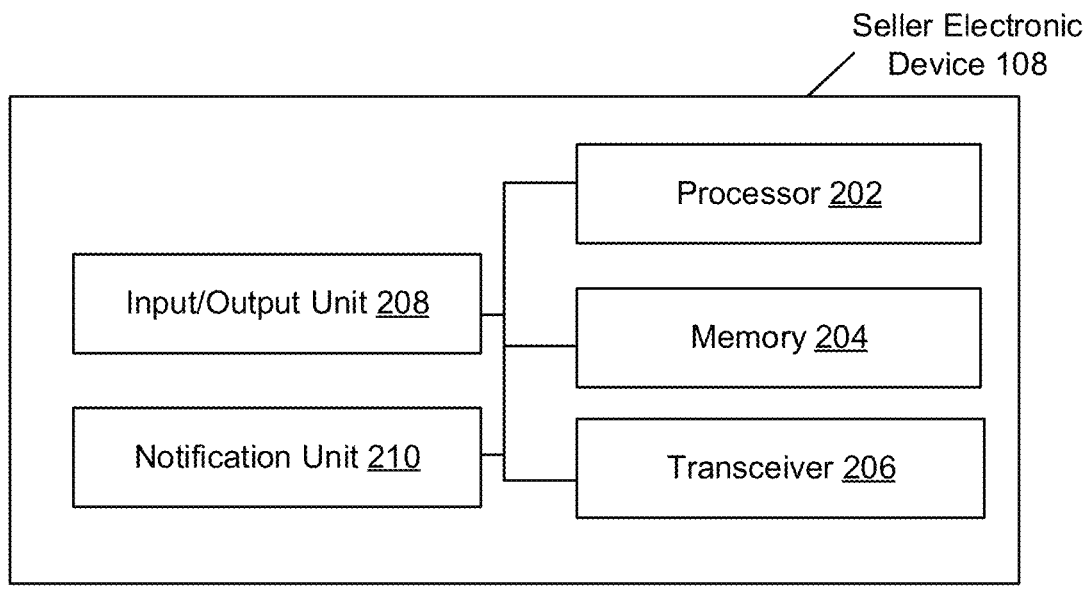
FIG. 2 is a block diagram that illustrates a seller electronic device configured for displaying one or more offers.

FIG. 2 is a block diagram that illustrates a seller electronic device 108 configured for displaying one or more offers. FIG. 2 is explained in conjunction with elements from FIG. 1. Here, the seller electronic device 108 preferably includes a processor 202, a memory 204, a transceiver 206, an input/output unit 208, and a notification unit 210. The processor 202 is further preferably communicatively coupled to the memory 204, the transceiver 206, the input/output unit 208, and the notification unit 210, while the transceiver 206 is preferably communicatively coupled to the communication network 106.

The processor 202 comprises suitable logic, circuitry, interfaces, and/or code that may be configured to execute a set of instructions stored in the memory 204, and may be implemented based on several processor technologies known in the art. The processor 202 works in coordination with the transceiver 206, the input/output unit 208, and the notification unit 210 for displaying one or more offers. Examples of the processor 202 include, but not limited to, an X86-based processor, a Reduced Instruction Set Computing (RISC) processor, an Application-Specific Integrated Circuit (ASIC) processor, and a Complex Instruction Set Computing (CISC) processor, for example.

The memory 204 comprises suitable logic, circuitry, interfaces, and/or code that may be configured to store the set of instructions, which are executed by the processor 202. Preferably, the memory 204 is configured to store one or more programs, routines, or scripts that are executed in coordination with the processor 202. Additionally, the memory 204 may be implemented based on a Random Access Memory (RAM), a Read-Only Memory (ROM), a Hard Disk Drive (HDD), a storage server, and/or a Secure Digital (SD) card.

The transceiver 206 comprises suitable logic, circuitry, interfaces, and/or code that may be configured to receive one or more offers via the communication network 106. The transceiver 206 is preferably configured to receive an input from the plurality of buyers indicating interest for purchase of the real estate asset, and is preferably further configured to transmitting the one or more offers to the remote cloud server, via the communication network 106. Additionally, the transceiver 206 may be further configured to receiving data comprising number of columns and number of rows to be displayed in a grid layout, categorized offers, fraudulent offers and updated price range to the seller's electronic device.

The transceiver 206 may implement one or more known technologies to support wired or wireless communication with the communication network 106. In an embodiment, the transceiver 206 may include, but is not limited to, an antenna, a radio frequency (RF) transceiver, one or more amplifiers, a tuner, one or more oscillators, a digital signal processor, a Universal Serial Bus (USB) device, a coder-decoder (CODEC) chipset, a subscriber identity module (SIM) card, and/or a local buffer. Also, the transceiver 206 may communicate via wireless communication with networks, such as the Internet, an Intranet and/or a wireless network, such as a cellular telephone network, a wireless local area network (LAN) and/or a metropolitan area network (MAN). Accordingly, the wireless communication may use any of a plurality of communication standards, protocols and technologies, such as: Global System for Mobile Communications (GSM), Enhanced Data GSM Environment (EDGE), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for email, instant messaging, and/or Short Message Service (SMS).

The input/output unit 208 comprises suitable logic, circuitry, interfaces, and/or code that may be configured to provide one or more inputs to the remote cloud application server 104 for displaying one or more offers. The input/output unit 208 comprises of various input and output devices that are configured to communicate with the processor 202. Examples of the input devices include, but are not limited to, a keyboard, a mouse, a joystick, a touch screen, a microphone, a camera, and/or a docking station. Examples of the output devices include, but are not limited to, a display screen and/or a speaker. The display screen is preferably configured to: display a real estate asset available for sale to a plurality of buyers, display one or more offers, display a number of buyers interested in making the one or more offers, and display the one or more offers received from one or more buyers to a seller in a grid layout.

The notification unit 208 comprises suitable logic, circuitry, interfaces, and/or code that may be configured to notify the plurality of buyers to submit one or more offers for purchase of the real estate asset after initiating a countdown for a pre-defined time interval.

Figure 3:
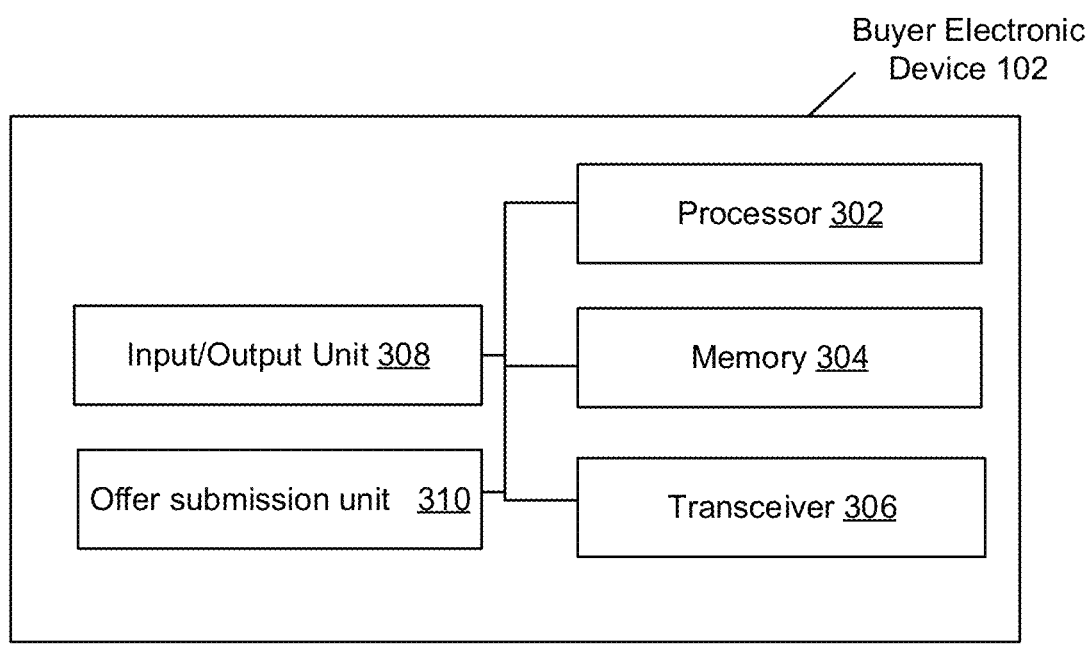
FIG. 3 is a block diagram that illustrates a buyer electronic device configured for displaying one or more offers.

FIG. 3 is a block diagram that illustrates a buyer electronic device 102 configured for displaying one or more offers, and is described in conjunction with elements from FIG. 1. In an embodiment, the buyer electronic device 102 preferably includes a processor 302, a memory 304, a transceiver 306, an input/output unit 308, and an offer submission unit 310. Accordingly, the processor 302 is preferably communicatively coupled to the memory 304, the transceiver 306, the input/output unit 308, and the offer submission unit 310, and the transceiver 306 may be communicatively coupled to the communication network 106.

The processor 302 comprises suitable logic, circuitry, interfaces, and/or code that may be configured to execute a set of instructions stored in the memory 304, and further the processor 302 may be implemented based on several processor technologies known in the art. The processor 302 works in coordination with the transceiver 306, the input/output unit 308, and the offer submission unit 310 for displaying one or more offers. Examples of the processor 302 include, but not limited to, an X86-based processor, a Reduced Instruction Set Computing (RISC) processor, an Application-Specific Integrated Circuit (ASIC) processor, a Complex Instruction Set Computing (CISC) processor, for example.

The memory 304 comprises suitable logic, circuitry, interfaces, and/or code that may be configured to store the set of instructions, which are executed by the processor 302. In an embodiment, the memory 304 may be configured to store one or more programs, routines, or scripts that are executed in coordination with the processor 302. The memory 304 may be implemented based on a Random Access Memory (RAM), a Read-Only Memory (ROM), a Hard Disk Drive (HDD), a storage server, and/or a Secure Digital (SD) card, for example.

The transceiver 306 comprises of suitable logic, circuitry, interfaces, and/or code that may be configured to transmit an input indicating interest for purchase of the real estate asset, via the communication network 106. Accordingly, the transceiver 306 may be further configured to receive notification to submit offers for purchase of the real estate asset within pre-defined time interval. Thus, the transceiver 306 may implement one or more known technologies to support wired or wireless communication with the communication network 106.

In an embodiment, the transceiver 306 may include, but is not limited to, an antenna, a radio frequency (RF) transceiver, one or more amplifiers, a tuner, one or more oscillators, a digital signal processor, a Universal Serial Bus (USB) device, a coder-decoder (CODEC) chipset, a subscriber identity module (SIM) card, and/or a local buffer. Thus configured, the transceiver 306 may communicate via wireless communication with networks, such as the Internet, an Intranet and/or a wireless network, such as a cellular telephone network, a wireless local area network (LAN) and/or a metropolitan area network (MAN). Wireless communication may use any of a variety of communication standards, protocols and technologies, such as: Global System for Mobile Communications (GSM), Enhanced Data GSM Environment (EDGE), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for email, instant messaging, and/or Short Message Service (SMS), for example.

The input/output unit 308 comprises suitable logic, circuitry, interfaces, and/or code that may be configured to provide one or more inputs to the remote cloud application server 104 and the seller electronic device 108 for displaying one or more offers. Thus, the input/output unit 308 comprises of various input and output devices that are configured to communicate with the processor 302. Examples of the input devices include, but are not limited to, a keyboard, a mouse, a joystick, a touch screen, a microphone, a camera, and/or a docking station. Examples of the output devices include, but are not limited to, a display screen and/or a speaker, for example. The display screen is preferably configured to: display a real estate asset available for sale to a plurality of buyers, and display one or more offers submitted by other buyers.

The offer submission unit 310 comprises suitable logic, circuitry, interfaces, and/or code that may be configured to provide offers for purchase of a real estate asset to the seller in response to a received notification to submit offers for purchase of the real estate asset within pre-defined time interval. The offer submission unit 310 may be further configured to notify each of the plurality of buyers when at least one of the buyers submits an offer for purchase of the real estate asset.

Figure 4:
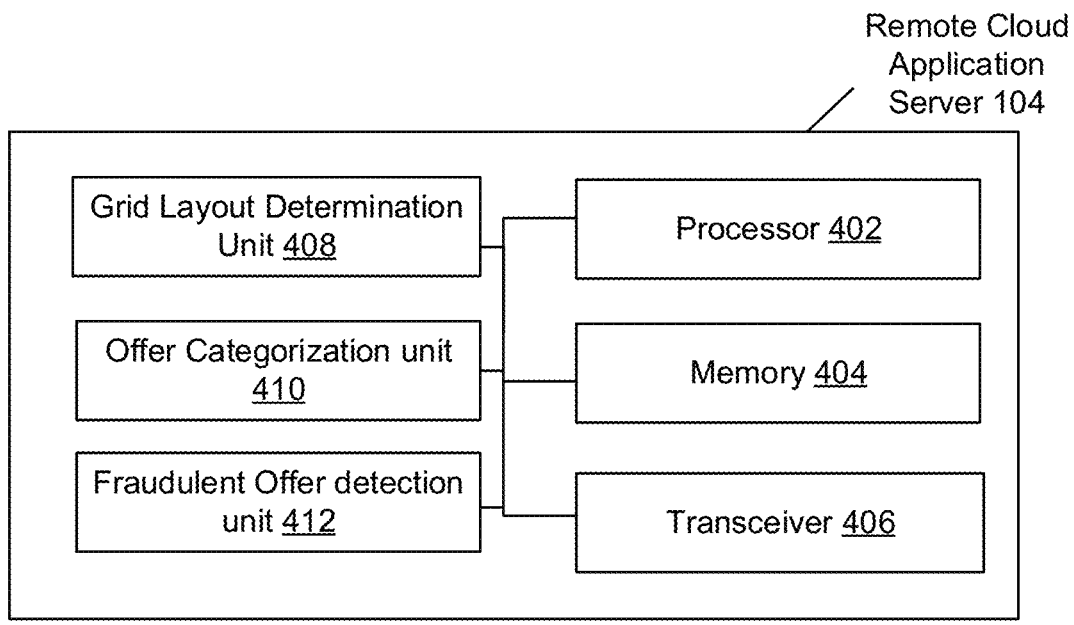
FIG. 4 is a block diagram that illustrates a remote cloud application server configured for displaying one or more offers.

FIG. 4 is a block diagram that illustrates a remote cloud application server 104 configured for displaying one or more offers and is explained in conjunction with elements from FIG. 1. Here, the remote cloud application server 104 preferably includes a processor 402, a memory 404, a transceiver 406, an input/output unit 408, a grid layout determination unit 410, offer categorization unit 412, and a fraudulent offer detection unit 414. Accordingly, the processor 402 is communicatively coupled to the memory 404, the transceiver 406, the input/output unit 408, and the grid layout determination unit 410, the offer categorization unit 412, and the fraudulent offer detection unit 414. Additionally, the transceiver 406 is preferably communicatively coupled to the communication network 106.

The processor 402 comprises suitable logic, circuitry, interfaces, and/or code that may be configured to execute a set of instructions stored in the memory 404, and may be implemented based on several processor technologies known in the arts. The processor 402 works in coordination with the transceiver 406, the input/output unit 408, the grid layout determination unit 410, the offer categorization unit 412, and the fraudulent offer detection unit 414 for displaying one or more offers. Examples of the processor 402 include, but not limited to, an X86-based processor, a Reduced Instruction Set Computing (RISC) processor, an Application-Specific Integrated Circuit (ASIC) processor, a Complex Instruction Set Computing (CISC) processor, for example.

The memory 404 comprises suitable logic, circuitry, interfaces, and/or code that may be configured to store the set of instructions, which are executed by the processor 402. The memory 404 may be configured to store one or more programs, routines, or scripts that are executed in coordination with the processor 402. Accordingly, the memory 404 may be implemented based on a Random Access Memory (RAM), a Read-Only Memory (ROM), a Hard Disk Drive (HDD), a storage server, and/or a Secure Digital (SD) card.

The transceiver 406 comprises of suitable logic, circuitry, interfaces, and/or code that may be configured to receive the one or more offers from the electronic device of the seller, via the communication network 106. Additionally, the transceiver 406 is preferably further configured to transmit data comprising number of columns and number of rows to be displayed in a grid layout, categorized offers, fraudulent offers and updated price range to the seller's electronic device, via the communication network 106.

The transceiver 406 may implement one or more known technologies to support wired or wireless communication with the communication network 106. Thus, the transceiver 406 may include, but is not limited to, an antenna, a radio frequency (RF) transceiver, one or more amplifiers, a tuner, one or more oscillators, a digital signal processor, a Universal Serial Bus (USB) device, a coder-decoder (CODEC) chipset, a subscriber identity module (SIM) card, and/or a local buffer. Thus, the transceiver 406 may communicate via wireless communication with networks, such as the Internet, an Intranet and/or a wireless network, such as a cellular telephone network, a wireless local area network (LAN) and/or a metropolitan area network (MAN). Accordingly, the wireless communication may use any of a plurality of communication standards, protocols and technologies, such as: Global System for Mobile Communications (GSM), Enhanced Data GSM Environment (EDGE), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for email, instant messaging, and/or Short Message Service (SMS), for example.

The input/output unit 408 comprises suitable logic, circuitry, interfaces, and/or code that may be configured to provide one or more inputs to the remote cloud application server 104 for displaying one or more offers. The input/output unit 408 comprises of various input and output devices that are configured to communicate with the processor 402. Examples of the input devices include, but are not limited to, a keyboard, a mouse, a joystick, a touch screen, a microphone, a camera, and/or a docking station, for example. Examples of the output devices include, but are not limited to, a display screen and/or a speaker.

The grid layout determination unit 410 comprises suitable logic, circuitry, interfaces, and/or code that may be configured to determine a number of columns and a number of rows to be displayed in a grid layout based on count of the one or more offers to be displayed. Additionally, the grid layout determination unit 410 may be configured to determine a number of buyers interested in making the one or more offers Further, the offer categorization unit 412 comprises suitable logic, circuitry, interfaces, and/or code that may be configured to categorize the one or more offers into one or more categories based on a seller's quoted price and each of the one or more categories has an associated price range that is determined using machine learning techniques The fraudulent offer detection unit 414 comprises suitable logic, circuitry, interfaces, and/or code that may be configured to identify one or more fraudulent offers from the one or more offers and in response to such identification adjusting the price range associated with each of the one or more categories.

In an exemplary operation, a seller may have a real estate asset that is available for sale. The seller may create a listing (on the seller electronic device 108) of the real estate asset that is available for sale to a plurality of buyers. The seller may also propose a seller's quoted price. The seller's quoted price is the price at which the seller preferably wishes to sell the real estate asset. After the listing is created, then the listing will be publicly viewable to a plurality of buyers. Accordingly, the real estate asset is available for sale to the plurality of buyers and may be displayed to both the seller and the plurality of buyers. Potential buyers may view the listed real estate asset on the buyer electronic device 102 and the seller may post the real estate asset that is available for sale using the seller electronic device 108.

After the plurality of buyers view the real estate asset that is available for sale, the plurality of buyers provide an input indicating interest for purchase of the real estate asset. For example, the buyer may click on a command button named "Express Interest in Asset". The seller then receives a notification(s) that one or more potential buyers are interested in purchasing the real estate asset. After the seller receives sufficient amount of interests, such as from a plurality of buyers, then the seller electronic device 108 may be configured to initiate a countdown for a pre-defined time interval. In response to the initiation of the countdown the plurality of buyers may be notified to submit one or more offers for purchase of the real estate asset.

In an embodiment, the plurality of buyers may be notified using at least one of: push notifications, text messages, and email. In response to the notification, the seller electronic device may be configured to receive one or more offers from the plurality of buyers, for example. As a specific example, the buyer who has expressed interest in the real estate asset may receive a text message such as "Please submit your purchase offer for the real estate asset located at ABC within next 4 hours. The seller's quoted price is USD 25000". In an embodiment, the plurality of buyers may perform a virtual tour of the real estate asset before submitting one or more offers for purchase of the real estate asset. The one or more offers submitted by a buyer may be publicly viewable to the plurality of buyers. Preferably, each of the plurality of buyers is notified when at least one of the plurality of buyers submits one or more offers for purchase of the real estate asset. Further, the plurality of buyers may communicate with the seller via an embedded messaging application in the buyer's electronic device 102.

In alternative embodiments, the buyers may receive notices in a priority order based on the type of offer they made, options they acquired or purchased, or in an order selected by the seller. Furthermore, it is understood that the word "offer" herein includes soft offers and/or other statements of interest which may be submitted for free, based on a set of conditions, or for a fee.

After the number of offers are received by the seller electronic device 108, then the count of the one or more offers is transmitted to the remote cloud application server 104. The grid layout determination unit 410 is preferably configured to determine a number of columns and a number of rows in the grid layout based on the count of the one or more offers to be displayed.

Further, the fraudulent offer detection unit 414 may be configured to identify one or more fraudulent offers (defined to include undesirable offers) from the one or more offers. In various embodiments, the fraudulent offers may be identified based on count of offers submitted associated with each buyer, buyer credibility score, buyer information, and the like. For example, if a buyer submits 10 different offers within four different price ranges for the same real estate asset and if the buyer has low credibility score then all such offers submitted by the buyer may be identified as fraudulent. Additionally, if the buyer information suggests that the credit score of the buyer is below a pre-defined threshold then the offers submitted by such buyers may be identified as fraudulent or otherwise undesirable.

Furthermore, after fraudulent offers are identified then each of the one or more offers are categorized into one or more categories based on a seller's quoted price. In an embodiment, the one or more categories comprise above the seller's quoted price, equal to the seller's quoted price, and below the seller's quoted price. However, preferably each of the one or more categories is preferably associated with a price range and the price range is determined using one or more machine learning techniques. For example, if the seller's quoted price is USD 749,900 and the seller has received eight offers comprising USD 899,881 (Offer 1), USD 823,000 (Offer 2), USD 525,000 (Offer 3), USD 400,000 (Offer 4), USD 675,000 (Offer 5), USD 900,000 (Offer 6), USD 775,000 (Offer 7), and USD 599,920 (Offer 8), then all the eight offers are divided into four categories viz. category 1: lower than the seller's quoted price, category 2: high than seller's quoted price, category 3: higher than seller's quoted price, and category 4: considerably higher than the seller's quoted price.

Thus, using machine learning techniques the offer categorization unit 410 may determine a price range associated with each category. For example, the price range for category 1 could be defined as USD 400,000-USD 749,899 (Offer 8, Offer 5, Offer 4, Offer 3) the price range for category 2 could be defined as USD 749,900-USD 800,000 (Offer 7), the price range for category 3 could be defined as USD 800,001-USD 824,999 (Offer 2), and the price range for category 4 could be defined as USD 825,000-USD 900,000 (Offer 1, Offer 6).

After the number of fraudulent offers are identified then a revised count of genuine offers received for purchase of the real estate asset is identified and further the price range associated with each of the one or more categories is updated/adjusted. For example, if the offer 6 submitted by a buyer is fraudulent then the price range for all the categories is updated and the offer 6 is removed and such an offer may not be displayed to the buyer. Thus, now only three categories are determined, and the price ranges associated with each category are in one embodiment updated as below.

Updated category 1: USD 400,000- USD 749,899 (Offer 8, Offer 5, Offer 4, Offer 3) Updated category 2: USD 749,900-USD 775,000 (Offer 7) Updated category 3: 775, 001-USD 900,000 (Offer 1, Offer 2)

After the updated price ranges and categorization is performed, the grid layout determination unit 408 is preferably configured to determine a number of columns and a number of rows required in the grid layout to display the offers. In continuation to the above example, assume that the seller has received seven (7) genuine offers. Thus, the grid layout determination unit 408 may determine that 2 rows will be required and in the first row 4 columns and in the second row 3 columns will be required to display the seven (7) offers. It is appreciated that the identification of the one or more fraudulent offers or determination of a number of columns and a number of rows in the grid layout may be performed on a remote cloud server.

The remote cloud application server 104 may be configured to transmit data comprising the number of columns and number of rows to be displayed in the grid layout, categorized offers, fraudulent offers and updated price range to the seller's electronic device 108, via the communication network 106. After the data is received from the remote cloud application server 104, the seller electronic device 108 may be configured to displaying one or more offers received from one or more buyers to the seller. Accordingly, the one or more offers are displayed in the grid layout as per the data received from the cloud server, while the grid layout also shows a number of buyers interested in making the offers.

A person skilled in the art will understand that the scope of the disclosure is not limited to displaying the one of more offers based on the aforementioned factors and using the aforementioned techniques, and that the examples provided do not limit the scope of the disclosure.

Figure 5:
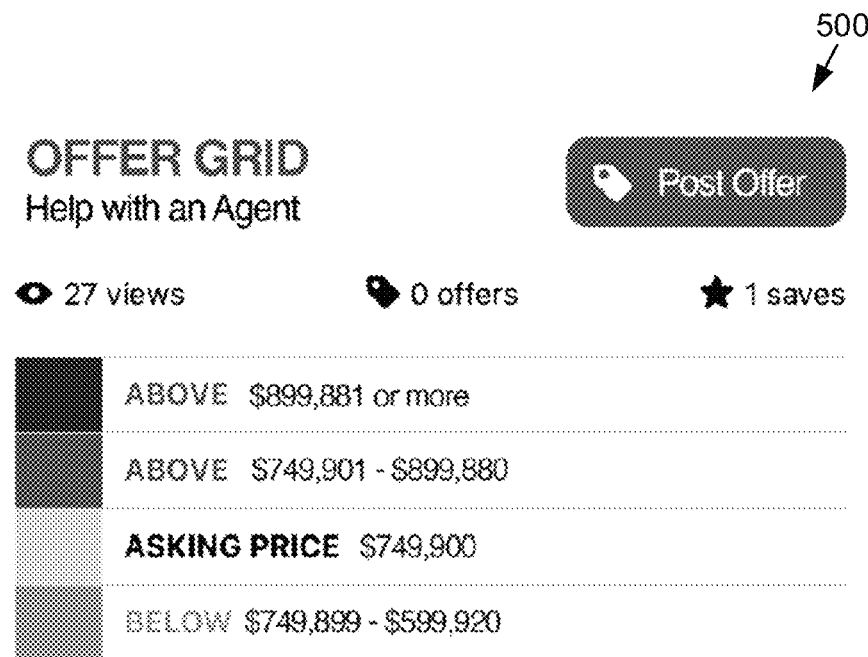
FIG. 5 illustrates a graphical user interface depicting the plurality of offers categorized within plurality of categories based on seller's quoted price.

FIG. 5 illustrates a graphical user interface 500 depicting the plurality of offers (here, soft offers) categorized within pluralities of categories based on seller's quoted price. The graphical user interface 500 is displayed to the seller and each of the buyers who are interested in purchasing the real estate asset.

As shown in FIG. 5 the seller's quoted price (aka, asking price) is USD 749,900 and three (3) categories are generated. The first category includes offers within the price range of USD 749,899-USD 599,920. The second category includes offers within the price range of USD 749,901-USD 899,880. The third category includes offers within the price range of USD 899,881 or more. Further, FIG. 5 shows that 27 buyers have viewed the offers posted by the plurality of offers. Additionally, a command button "Post Offer" may be visible to the buyer and an interested may click on the command button "Post Offer" and then submit a price for which the buyer wishes to purchase the real estate asset.

Figure 6:
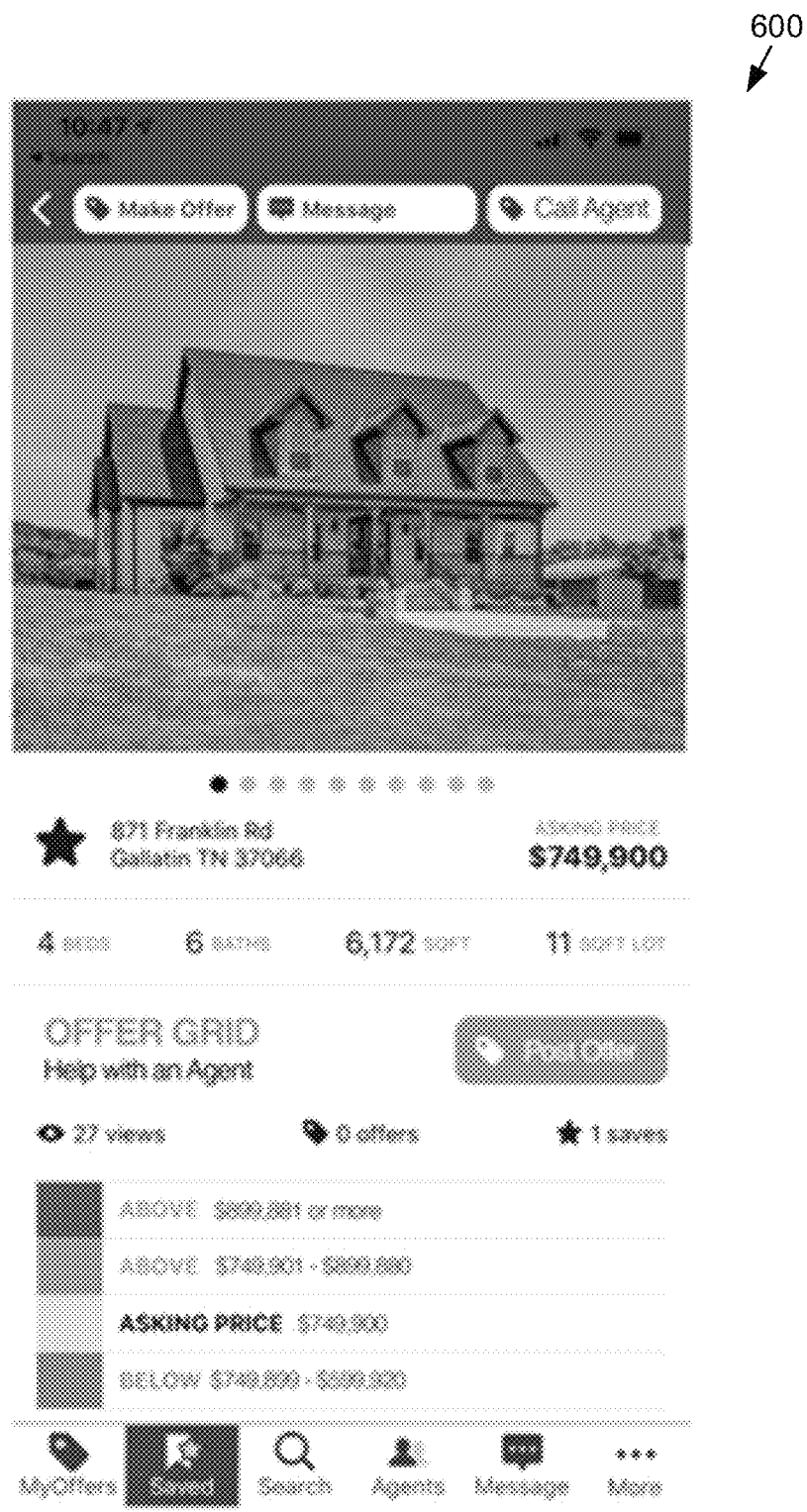
FIG. 6 illustrates a graphical user interface that depicts a home-buying app with a selected home that is available for sale.
Figure 7:
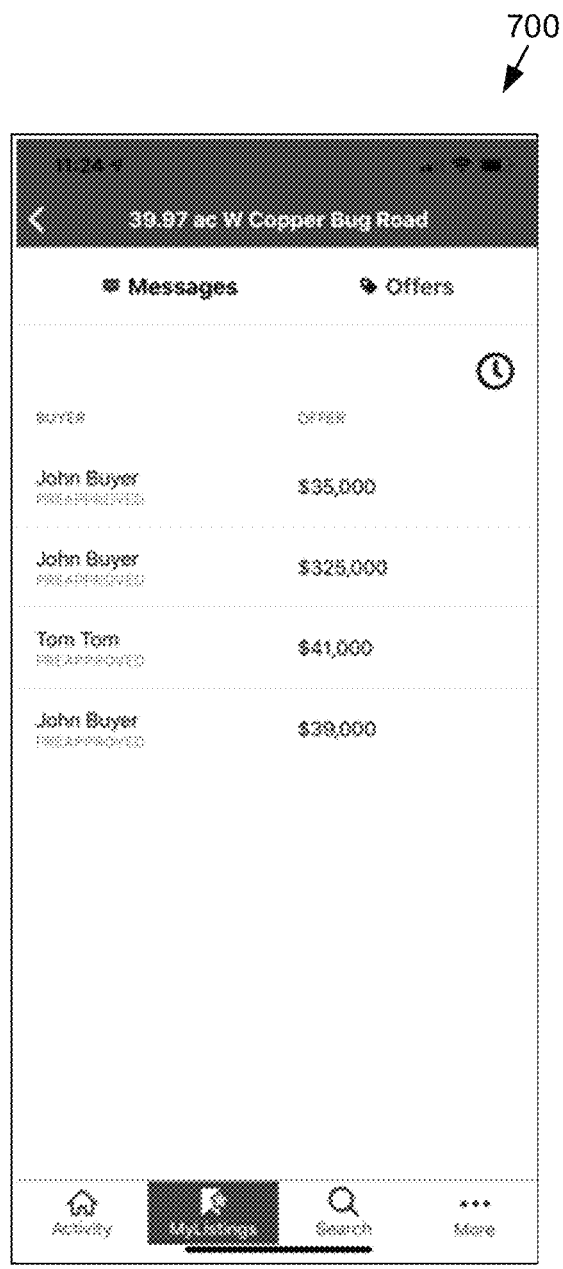
FIG. 7 illustrates a graphical user interface that depicts the grid layout showing the plurality of offers.

FIG. 6 illustrates a graphical user interface 600 that depicts a home-buying app with a selected home that is available for sale. The graphical user interface 600 illustrates a screen that is shown to the buyer. The buyer may view a plurality of real estate assets and then may perform a selection of a real estate asset (home) for which the buyer is interested to submit the offer. The buyer may be able to view the address of the selected home. For example, as shown in FIG. 6 the address of the selected home is "872 Franklin Road, Gallatin, Tenn., 37066". Additionally, as shown in FIG. 6 the asking price (seller's quoted price) is visible to the potential buyers. Further details associate with the selected home, such as the number of bedrooms, square footage/area, number of bathrooms and the like may also be displayed. When the plurality of potential buyers submit the offers, then the seller may view all the received offers for purchase as illustrated in a graphical user interface 700 (shown in FIG. 7) that depicts a grid layout showing the plurality of offers. The graphical user interface 700 depicts a list of the offers made by the buyers and also may display the message(s) sent by each of the potential (aka prospective) buyers. A potential buyer may also send a message to the seller or the agent using the graphical user interface 600.

Figure 8:
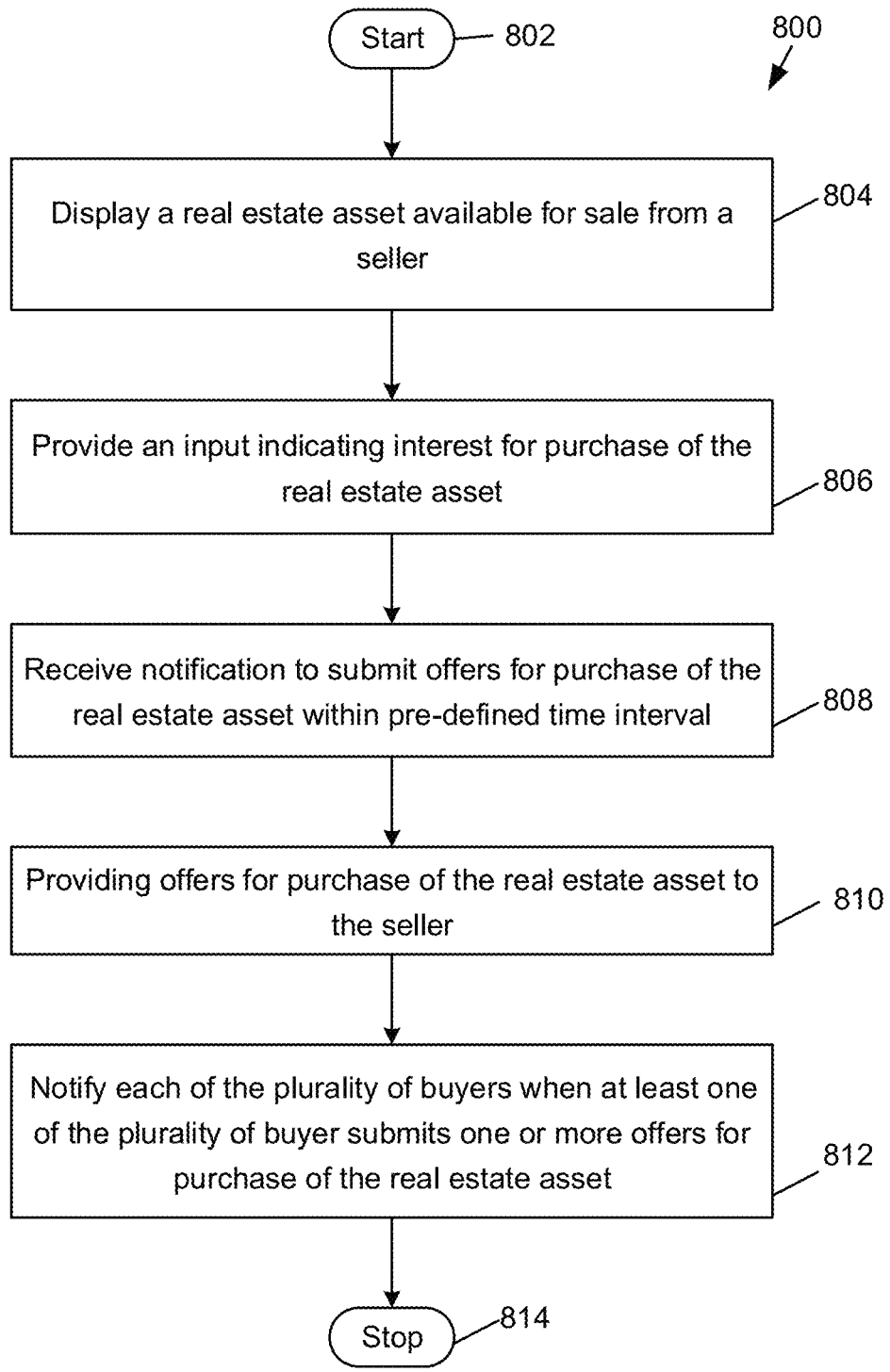
FIG. 8 is a flowchart that illustrates a method for displaying one or more offers on a seller's electronic device.

FIG. 8 is a flowchart that illustrates a method 800 for displaying one or more offers on a (prospective) buyer's electronic device 102. The method begins in a Start step 802 and proceeds to a Display step 804.

In the Display step 804 the buyer's electronic device 102 displays a real estate asset available for sale from a seller. At a Provide Input step 806, the buyer's electronic device 102 provides an input indicating interest for purchase of the real estate asset. Then, in a Receive Notification step 808, the buyer's electronic device 102 receives notification to submit offers for purchase of the real estate asset within pre-defined time interval. At Provide Offer step 810, the buyer's electronic device 102 provides offers for purchase of the real estate asset to the seller, then in a Notify step 812, the buyer's electronic device 102 notifies each of the plurality of buyers when at least one of the plurality of buyer submits one or more offers for purchase of the real estate asset. Control passes to at the Stop step 814.

Figure 9:
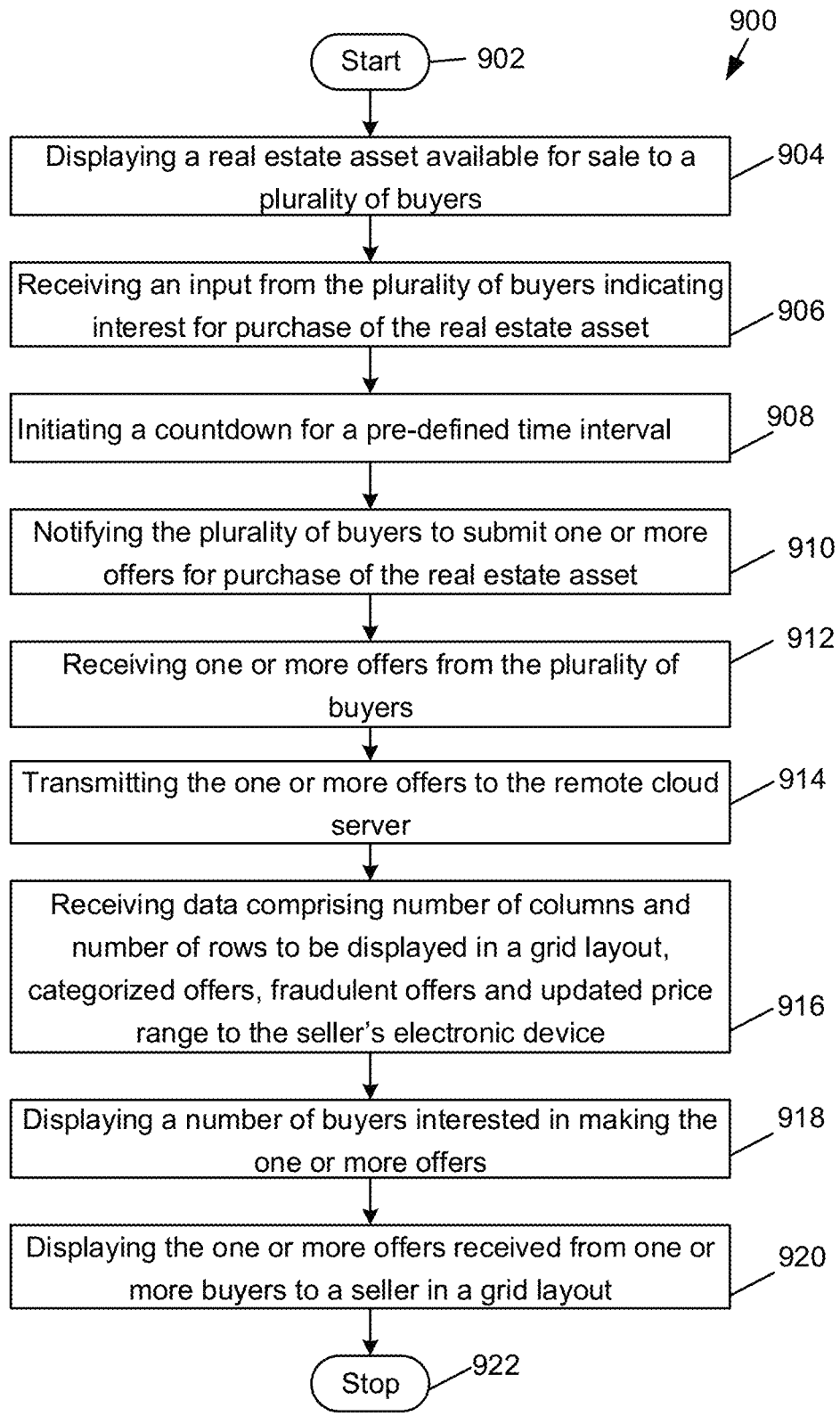
FIG. 9 is a flowchart that illustrates a method for displaying one or more offers on a buyer's electronic device.

FIG. 9 is a flowchart that illustrates a method 900 for displaying one or more offers on a seller's electronic device 108. The method starts in a Start step 902 and proceeds to a Display step 904.

In the Display step 904, the seller's electronic device 108 displays a real estate asset available for sale to a plurality of buyers. Then, in a Receive Input step 906, the seller's electronic device 108 receives an input from the plurality of buyers indicating interest for purchase of the real estate asset. Next, in an Initiate Countdown step 908, the seller's electronic device 108 initiates a countdown for a pre-defined time interval, after which in a Notify step 910, the seller's electronic device 108 notifies the plurality of buyers to submit one or more offers for purchase of the real estate asset. Then, in a Receive Offers step 912, the seller's device receives one or more offers from the plurality of buyers, while in a Transmit step 914 the seller's electronic device 108 transmits the one or more offers to the remote cloud server. As with the other steps, the Transmit step 914 does not necessarily follow the shown preceding Receive Offers step 912.

In a Receive Data step 916 the seller's electronic device 108 receives data comprising a number of columns and a number of rows to be displayed in a grid layout, categorized offers, fraudulent offers and updated price range(s) to the seller's electronic device. Then, in a Display step 918, the seller's electronic device 108 displays a number of buyers interested in submitting the one or more offers. Next, in a Display Received Offers step 920, the seller's electronic device 108 displays the one or more offers received from one or more buyers to a seller in a grid layout. Then the method 900 terminates as control passes in a Stop step 922.

Figure 10:
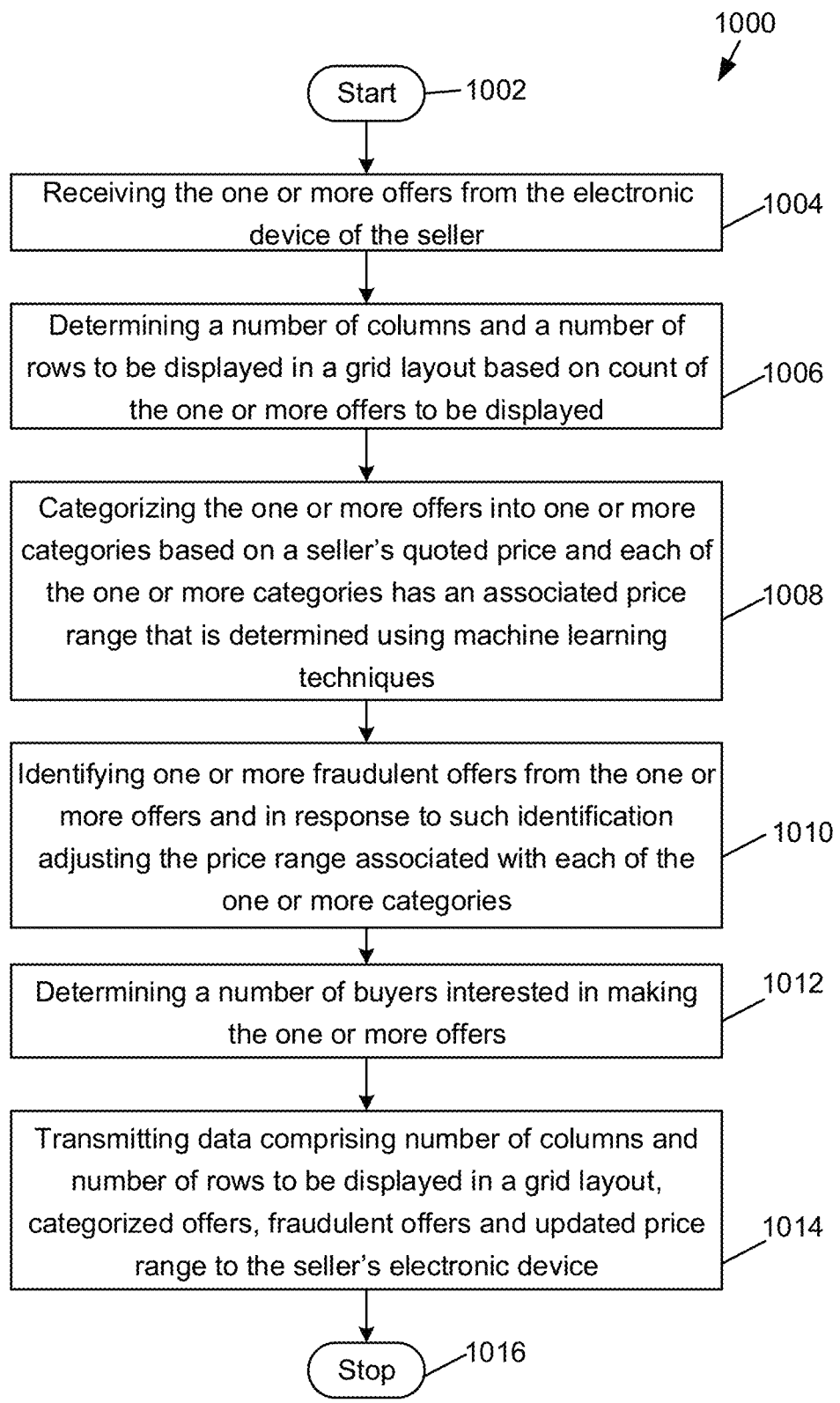
FIG. 10 is a flowchart that illustrates a method for displaying one or more offers on a remote cloud application server.

FIG. 10 is a flowchart that illustrates a method 1000 for displaying one or more offers on a remote cloud application server 104. The method begins at a Start step 1002 and proceeds to a Receiving Offer(s) step 1004.

In the Receiving Offer(s) step 1004, the remote cloud application server 104 may be configured to receiving the one or more offers from the electronic device of the seller. Next, at a Determining Columns step 1006, the remote cloud application server 104 may be configured to determining a number of columns and a number of rows to be displayed in a grid layout based on count of the one or more offers to be displayed. Then in a Categorizing step 1008, the remote cloud application server 104 may be configured to categorizing the one or more offers into one or more categories based on a seller's quoted price and each of the one or more categories has an associated price range that is determined using machine learning techniques.

After the Categorizing step 1008 in a Identifying step 1010, the remote cloud application server 104 may be configured to identifying one or more fraudulent offers from the one or more offers and in response to such identification adjusting the price range associated with each of the one or more categories. Next in a Determining Buyers step 1012, the remote cloud application server 104 may be configured to determining a number of buyers interested in making the one or more offers. Afterwards, in a Transmitting Data step 1014, the remote cloud application server 104 may be configured to transmitting data comprising number of columns and number of rows to be displayed in a grid layout, categorized offers, fraudulent offers and updated price range to the seller's electronic device. Control passes to in a Stop step 1016.

FIG. 11 illustrates a block diagram of an exemplary computer system 1101 for implementing embodiments consistent with the present disclosure.

Variations of computer system 1101 may be used for performing optical character recognition on an image including a plurality of printed characters. The computer system 1101 may comprise a central processing unit ("CPU" or "processor") 1102. The processor 1102 may comprise at least one data processor for executing program components for executing user- or system-generated requests. A user may include a person, a person using a device such as such as those included in this disclosure, or such a device itself. Additionally, the processor 1102 may include specialized processing units such as integrated system (bus) controllers, memory management control units, floating point units, graphics processing units, digital signal processing units, or the like. In various implementations the processor 1102 may include a microprocessor, such as AMD Athlon, Duron or Opteron, ARM's application, embedded or secure processors, IBM PowerPC, Intel's Core, Itanium, Xeon, Celeron or other line of processors, for example. Accordingly, the processor 1102 may be implemented using mainframe, distributed processor, multi-core, parallel, grid, or other architectures. Some embodiments may utilize embedded technologies like application-specific integrated circuits (ASICs), digital signal processors (DSPs), or Field Programmable Gate Arrays (FPGAs), for example.

Processor 1102 may be disposed in communication with one or more input/output (I/O) devices via I/O interface 1103. Accordingly, the I/O interface 1103 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n /b/g/n/x, Bluetooth, cellular (e.g., code-division multiple access (CDMA), high-speed packet access (HSPA+), global system for mobile communications (GSM), long-term evolution (LTE), WiMax, or the like, for example.

Using the I/O interface 1103, the computer system 1101 may communicate with one or more I/O devices. For example, the input device 1104 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, gyroscope, proximity sensor, or the like), stylus, scanner, storage device, transceiver, video device/source, or visors, for example. Likewise, an output device 1105 may be a printer, fax machine, video display (e.g., cathode ray tube (CRT), liquid crystal display (LCD), light-emitting diode (LED), plasma, or the like), or audio speaker, for example. In some embodiments, a transceiver 1106 may be disposed in connection with the processor 1102. The transceiver 1106 may facilitate various types of wireless transmission or reception. For example, the transceiver 1106 may include an antenna operatively connected to a transceiver chip (example devices include the Texas Instruments® WiLink WL1283, Broadcom® BCM4750IUB8, Infineon Technologies® X-Gold 618-PMB9800, or the like), providing IEEE 802.11a/b/g/n, Bluetooth, FM, global positioning system (GPS), and/or 2G/3G/5G HSDPA/HSUPA communications, for example.

In some embodiments, the processor 1102 may be disposed in communication with a communication network 1108 via a network interface 1107. The network interface 1107 is adapted to communicate with the communication network 1108. The network interface 1107 may employ connection protocols including, without limitation, direct connect, Ethernet (e.g., twisted pair 10/100/1000 Base T), transmission control protocol/internet protocol (TCP/IP), token ring, or IEEE 802.11a/b/g/n/x, for example. The communication network 1108 may include, without limitation, a direct interconnection, local area network (LAN), wide area network (WAN), wireless network (e.g., using Wireless Application Protocol), or the Internet, for example. Using the network interface 1107 and the communication network 1108, the computer system 1101 may communicate with devices such as shown a mobile/cellular phone 1110, a Point of Sale Terminal 1111, or a laptop 1109. Other exemplary devices may include, without limitation, personal computer(s), server(s), fax machines, printers, scanners, various mobile devices such as cellular telephones, smartphones (e.g., Apple iPhone, Blackberry, Android-based phones, etc.), tablet computers, eBook readers (Amazon Kindle, Nook, etc.), laptop computers, notebooks, gaming consoles (Microsoft Xbox, Nintendo DS, Sony PlayStation, etc.), or the like. In some embodiments, the computer system 1101 may itself embody one or more of these devices.

In some embodiments, the processor 1102 may be disposed in communication with one or more memory devices (e.g., RAM 1113, ROM 1114, etc.) via a storage interface 1112. The storage interface 1112 may connect to memory devices including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, or solid-state drives, for example.

The memory devices may store a collection of program or database components, including, without limitation, an operating system 1116, user interface application 1117, web browser 1118, mail server 1119, mail client 1120, user/application data 1121 (e.g., any data variables or data records discussed in this disclosure) for example. The operating system 1116 may facilitate resource management and operation of the computer system 1101. Examples of operating systems include, without limitation, Apple Macintosh OS X, UNIX, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like.

A user interface 1117 if for facilitating the display, execution, interaction, manipulation, or operation of program components through textual or graphical facilities. For example, user interfaces may provide computer interaction interface elements on a display system operatively connected to the computer system 1101, such as cursors, icons, check boxes, menus, scrollers, windows, or widgets, for example. Graphical user interfaces (GUIs) may be employed, including, without limitation, Apple Macintosh operating systems' Aqua, IBM OS/2, Microsoft Windows (e.g., Aero, Metro, etc.), Unix X-Windows, or web interface libraries (e.g., ActiveX, Java, Javascript, AJAX, HTML, Adobe Flash, etc.), for example.

In some embodiments, the computer system 1101 may implement a web browser 1118 stored program component. The web browser 1118 may be a hypertext viewing application, such as Microsoft Internet Explorer, Google Chrome, Mozilla Firefox, Apple Safari, or Microsoft Edge, for example. Secure web browsing may be provided using HTTPS (secure hypertext transport protocol), secure sockets layer (SSL), Transport Layer Security (TLS), or the like. Web browsers may utilize facilities such as AJAX, DHTML, Adobe Flash, JavaScript, Java, or application programming interfaces (APIs), for example. In some embodiments the computer system 1101 may implement a mail server 1119 stored program component. The mail server 1119 may be an Internet mail server such as Microsoft Exchange, or the like. The mail server may utilize facilities such as ASP, ActiveX, ANSI C++/C#, Microsoft .NET, CGI scripts, Java, JavaScript, PERL, PHP, Python, or WebObjects, for example. The mail server 1119 may utilize communication protocols such as internet message access protocol (IMAP), messaging application programming interface (MAPI), Microsoft Exchange, post office protocol (POP), simple mail transfer protocol (SMTP), or the like. In some embodiments, the computer system 401 may implement a mail client 1120 stored program component. The mail client 1120 may be a mail viewing application, such as Apple Mail, Microsoft Entourage, Microsoft Outlook, or Mozilla Thunderbird.

In some embodiments, the computer system 1101 may store user/application data 1121, such as the data, variables, records, or the like as described in this disclosure. Such databases may be implemented as fault-tolerant, relational, scalable, secure databases such as Oracle or Sybase, for example. Alternatively, such databases may be implemented using standardized data structures, such as an array, hash, linked list, struct, structured text file (e.g., XML), table, or as object-oriented databases (e.g., using ObjectStore, Poet, Zope, etc.). Such databases may be consolidated or distributed, sometimes among the various computer systems discussed above in this disclosure. It is to be understood that the structure and operation of the any computer or database component may be combined, consolidated, or distributed in any working combination.

Furthermore, one or more computer-readable storage media may be utilized in implementing embodiments consistent with the present invention. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium"

should be understood to include tangible items and exclude carrier waves and transient signals, i.e., non-transitory. Examples include Random Access Memory (RAM), Read-Only Memory (ROM), volatile memory, nonvolatile memory, hard drives, Compact Disc (CD) ROMs, Digital Video Disc (DVDs), flash drives, disks, and any other known physical storage media.

Various embodiments of the disclosure encompass numerous advantages including methods and systems for displaying one or more offers. In an embodiment, the methods and systems may provide a transparent system to the buyers for buying real estate asset and further preventing the buyers from potentially missing the opportunity to buy the real estate asset because of a slightly higher offer placed by some other buyers which they were unaware. In contrast to the conventional approach the seller is completely aware of the number of offers, including soft offers or other statements of interest, that the seller has received and the price range proposed by the other potential buyers. Further, the seller gets a view on whether the received offers are within the price range proposed by the buyer or below it or above it, thereby making it easy for the seller to assess and obtain the best value for the real estate asset that is available for sale.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted for carrying out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions.

A person with ordinary skills in the art will appreciate that the systems, modules, and sub-modules have been illustrated and explained to serve as examples and should not be considered limiting in any manner. It will be further appreciated that the variants of the above disclosed system elements, modules, and other features and functions, or alternatives thereof, may be combined to create other different systems or applications.

Those skilled in the art will appreciate that any of the aforementioned steps and/or system modules may be suitably replaced, reordered, or removed, and additional steps and/or system modules may be inserted, depending on the needs of a particular application. In addition, the systems of the aforementioned embodiments may be implemented using a wide variety of suitable processes and system modules, and are not limited to any particular computer hardware, software, middleware, firmware, microcode, and the like. The claims can encompass embodiments for hardware and software, or a combination thereof.

While the present disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments falling within the scope of the appended claims.

What is claimed is:

1. A method for displaying one or more offers, the method comprising:
    displaying, by a seller electronic device, a real estate asset available for sale to a plurality of potential buyers, wherein the plurality of potential buyers provide an input indicating interest for purchase of the real estate asset;
    initiating, by the seller electronic device, a countdown for a pre-defined time interval wherein the plurality of potential buyers are notified to submit one or more soft offers for purchase of the real estate asset, wherein the software detects a tour of the real estate asset and categorizes the tour as a virtual tour or an in-person tour of the real estate asset before accepting one or more offers for purchase of the real estate asset;
    in response to the notification, receiving via the seller electronic device, the one or more soft offers from the plurality of potential buyers; and
    displaying, via the seller electronic device, the one or more soft offers received from one or more potential buyers to a seller, wherein the one or more soft offers are displayed in a grid layout, wherein
        the grid layout shows a number of buyers interested in making the one or more soft offers,
        the one or more soft offers are categorized into one or more categories based on a seller's quoted price, and
        each of the one or more categories is associated with a price range, wherein the price range is determined using one or more machine learning techniques.

2. The method of claim 1 wherein the plurality of buyers is notified using at least one of: push notifications, text messages, and email.

3. The method of claim 1 wherein the one or more categories comprise a category above the seller's quoted price, a category equal to the seller's quoted price, and a category below the seller's quoted price.

4. The method of claim 1 wherein the plurality of potential buyers perform a virtual tour of the real estate asset before submitting one or more offers for purchase of the real estate asset.

5. The method of claim 1, wherein the potential buyer is real estate buyer and the seller is a real estate seller, and wherein the one or more offers are publicly viewable to the plurality of buyers.

6. The method of claim 1 wherein the price range is determined using one or more machine learning techniques.

7. The method of claim 1 wherein the plurality of buyers communicate with the seller via an embedded messaging application.

8. The method of claim 1 further comprising determining, via the seller electronic device, a number of columns and a number of rows in the grid layout based on the count of the one or more offers to be displayed.

9. The method of claim 1, further comprising identifying, via the electronic device, one or more fraudulent offers from the one or more offers and in response to such identification adjusting the price range associated with each of the one or more categories.

10. An electronic device for displaying one or more offers to a seller, the electronic device comprising:
    a hardware processor; and a memory communicatively coupled to the hardware processor, wherein the memory stores processor instructions, which, on execution, causes the hardware processor to:

display a real estate asset available for sale to a plurality of buyers, wherein the plurality of potential buyers provide an input indicating interest for purchase of the real estate asset;

initiate a countdown for a pre-defined time interval, wherein the plurality of potential buyers are notified to submit one or more soft offers for purchase of the real estate asset, wherein the software detects a tour of the real estate asset and categorizes the tour as a virtual tour or an in-person tour of the real estate asset before accepting one or more offers for purchase of the real estate asset;

in response to the notification, receive one or more soft offers from the plurality of potential buyers; and display the one or more soft offers received from one or more buyers to a seller, wherein the one or more soft offers are displayed in a grid layout, wherein the grid layout shows a number of potential buyers interested in making the one or more soft offers, wherein the one or more soft offers are categorized into one or more categories based on the seller's quoted price, and wherein each of the one or more categories is associated with a price range, wherein the price range is determined using one or more machine learning techniques; and adjust the price range associated with each of the one or more categories in response to categorization of a tour as live or virtual.

11. The electronic device of claim 10 wherein the plurality of potential buyers is notified using at least one of: push notifications, text messages, and email.

12. The electronic device of claim 10 wherein the one or more categories comprise a category above the seller's quoted price, a category equal to the seller's quoted price, and a category below the seller's quoted price.

13. The electronic device of claim 10 wherein the plurality of potential buyers must perform a virtual tour of the real estate asset before submitting one or more soft offers for purchase of the real estate asset.

14. The electronic device of claim 10 wherein the price range is determined using one or more machine learning techniques.

15. The electronic device of claim 10 wherein each of the plurality of potential buyers is notified when at least one of the plurality of buyers submits one or more offers for purchase of the real estate asset.

16. The electronic device of claim 10 wherein the hardware processor is further configured to determine a number of columns and a number of rows in the grid layout based on the count of the one or more offers to be displayed.

17. The electronic device of claim 10 wherein the hardware processor is further configured to identify one or more fraudulent offers from the one or more offers and in response to such identification adjusting the price range associated with each of the one or more categories.

18. The electronic device of claim 10 wherein identification of the one or more fraudulent offers is performed on a remote cloud server.

19. A non-transitory computer readable medium including instruction stored thereon that when processed by at least one hardware processor cause an electronic device to perform an operation comprising:

displaying a real estate asset available for sale to a plurality of potential buyers, wherein the plurality of potential buyers provide an input indicating interest for purchase of the real estate asset;

initiating a countdown for a pre-defined time interval, where the plurality of potential buyers are notified to submit one or more soft offers for purchase of the real estate asset, wherein the software detects a tour of the real estate asset and categorizes the tour as a virtual tour or an in-person tour of the real estate asset before accepting one or more offers for purchase of the real estate asset;

in response to the notification, receiving one or more soft offers from the plurality of potential buyers; and displaying the one or more soft offers received from one or more potential buyers to a seller, and displayed in a grid layout, wherein the grid layout shows a number of potential buyers interested in making the one or more soft offers, the one or more soft offers are categorized into one or more categories based on a seller's quoted price, adjust the price range associated with each of the one or more categories in response to categorization of a tour as live or virtual, and each of the one or more categories is associated with a price range and the price range is determined using one or more machine learning techniques.

* * * * *